Aug. 18, 1931.  J. A. WHITCOMB  1,819,580
FRONT WHEEL DRIVE FOR MOTOR VEHICLES
Filed Nov. 4, 1929  2 Sheets-Sheet 1
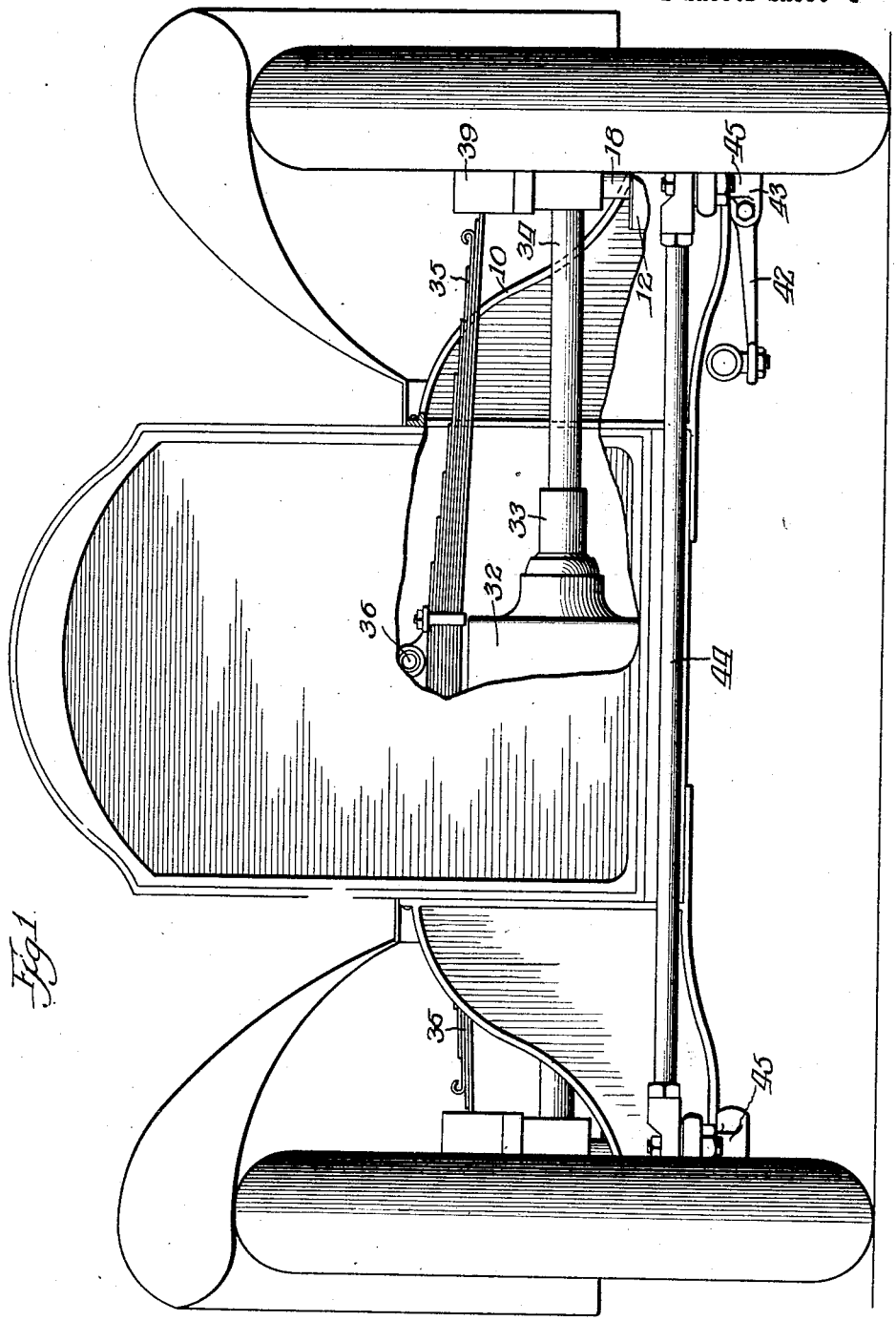
Witness:
R. B. Davison.
Inventor:
James A. Whitcomb.
By Cromwell, Greist & Warden
Attys

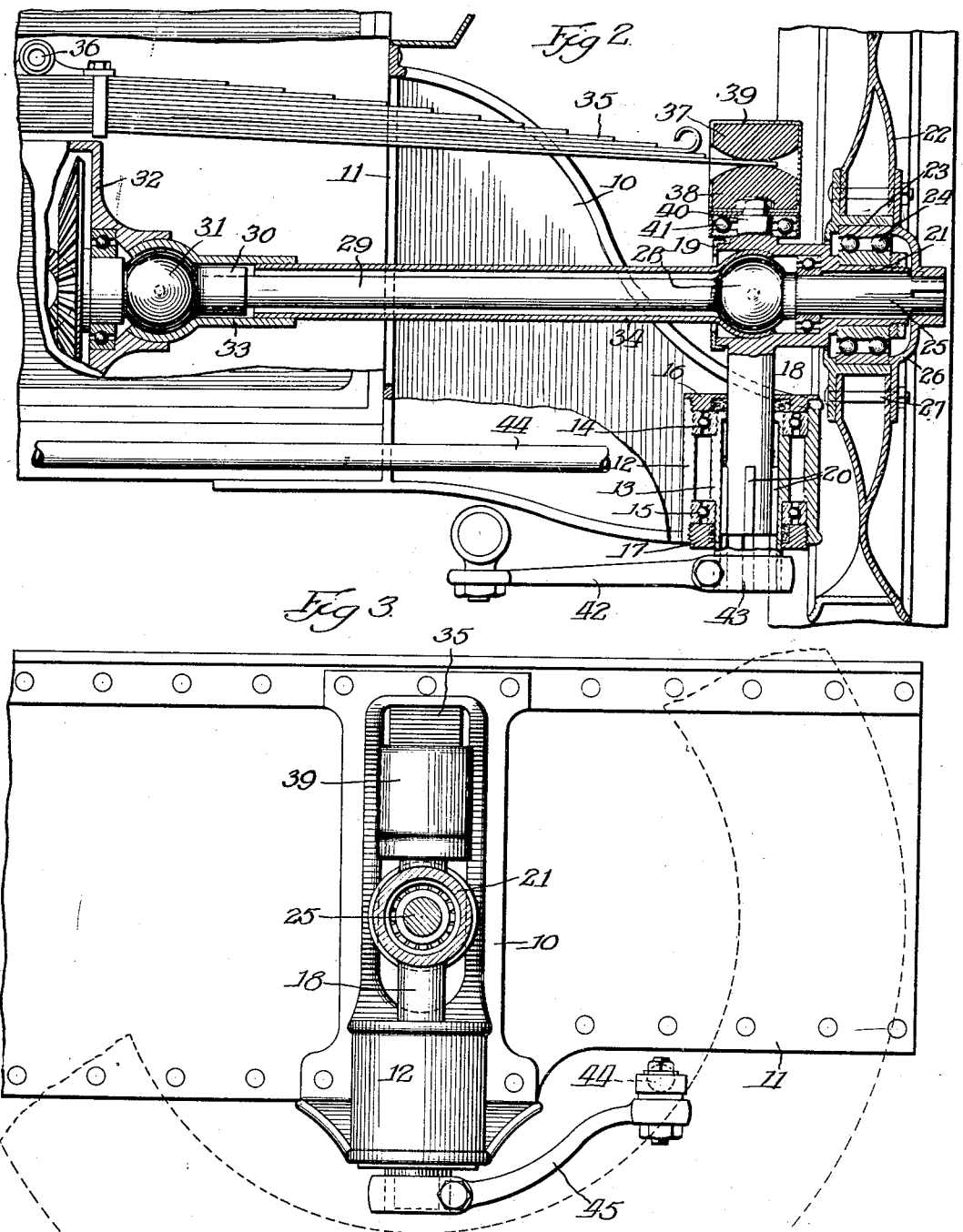

Patented Aug. 18, 1931

1,819,580

UNITED STATES PATENT OFFICE

JAMES A. WHITCOMB, OF KENOSHA, WISCONSIN; EMMA E. WHITCOMB AND THELMA G. WHITCOMB, OF KENOSHA, WISCONSIN, ADMINISTRATRICES OF SAID JAMES A. WHITCOMB, DECEASED

FRONT WHEEL DRIVE FOR MOTOR VEHICLES

Application filed November 4, 1929. Serial No. 404,860.

This invention is concerned with motor vehicles of the front wheel drive type, and has for its object the provision of a front wheel drive of novel and distinctly improved construction, arrangement and operation.

The front wheel drive of the invention affords an excellent spring support for the front end of the vehicle, an extremely flexible connection for the transmission of power to the wheel, and a free pivotal mounting for the wheel, all of which desirable features are so structurally combined as to function independently and without interference with each other. It also greatly reduces the unsprung weight, completely overcomes any tendency to shimmy or wobble, makes for greater safety and gives more accurate control of the vehicle.

While the foregoing statements are indicative in a general way of the nature of the invention, other more specific objects and advantages will be evident to those skilled in the art upon a full understanding of the construction, arrangement and operation of the novel front wheel drive.

In order that the invention may be readily understood, one form of the same is presented herein, but it will of course be appreciated that such form has been chosen primarily for the purpose of exemplification and that the invention is susceptible of embodiment in other structurally modified forms coming equally within the scope of the appended claims.

In the accompanying drawings:

Fig. 1 is a front view of a motor vehicle equipped with a front wheel drive constructed in accordance with the invention, certain parts being broken away for clearness;

Fig. 2 is a vertical transverse section through the left side of the front portion of the vehicle, showing the left front wheel mounting in sectional detail; and Fig. 3 is a vertical section, taken just inside the right front wheel.

The front wheel drive assembly shown in the drawings includes a bracket 10 which is secured to one side of the frame 11 of the motor vehicle. The bracket projects laterally from the frame, and is provided at its outer end with a vertically extending tubular portion 12 in which a sleeve 13 is positioned. The sleeve is rotatably mounted in the tubular portion 12 of the bracket in upper and lower sets of ball bearings 14 and 15, and is prevented from moving vertically therein by top and bottom retaining caps 16 and 17.

The sleeve 13 fits about the vertically extending pivot portion 18 of a steering knuckle 19, which pivot portion is free to shift vertically in the sleeve but is prevented from turning relative thereto by a number of splines 20. The knuckle 19 is provided above the pivot portion 18 with a hollow horizontally extending spindle portion 21 on which a wheel 22 is rotatably mounted on inner and outer sets of ball bearings 23 and 24. A full-floating stub axle 25 is positioned concentrically within the spindle portion 21 and is detachably connected at its outer end to a hub plate 26 which is in turn detachably connected adjacent its periphery to the wheel 22 by a number of bolts 27. The axle 25 terminates at its inner end in a universal driving joint 28 which is located in alignment with the axis of the pivot portion 18 of the knuckle 19. The joint 28 flexibly connects the axle 25 with a power-transmitting shaft 29 which telescopes at its inner end into a short tube 30. The shaft 29 is shiftable longitudinally of the tube 30 and is held against rotation relative to the tube by any suitable means. The tube 30 terminates in a second universal driving joint 31, which joint flexibly connects the shaft 29 with one side of a differential mechanism 32 which is mounted in the frame of the vehicle in front of the motor, clutch and transmission, not shown. The parts 28, 29 and 30 are protectively encased within two telescopically associated tubes 33 and 34.

Upward movement of the knuckle 19 in the bracket 10 is yieldingly resisted by a leaf spring 35 which is attached at 36 to the center of the frame of the vehicle. One of the free ends of the spring extends laterally to a point above the pivotal axis of the vertically extending portion 18 of the knuckle, where it is engaged between two rubber blocks 37 and 38. The blocks are enclosed within a case 39 which is swiveled on a stud 40 in vertical alignment with the axis of the pivot portion 18 of the knuckle and is supported on a set of ball bearings 41.

The blocks 37 and 38 permit a certain amount of endwise movement of the spring 35 without changing the point or direction of application of the spring pressure, and do not change their positions when the knuckle is turned in one direction or the other in steering. The relatively high point at which the pressure of the spring is applied results in an extremely stable arrangement which in large measure relieves the portion 18 of lateral strains and stresses.

The knuckle 19 is turned in steering by an arm 42 which is connected with the usual steering mechanism, not shown. The arm 42 is slotted and enlarged at 43 and is clamped at that point about the lower end of the sleeve 13 below the tubular portion 12 of the bracket. When the arm 42 is swung in one direction or the other, the sleeve 13 is correspondingly turned, and the pivot portion 18 of the knuckle, being splined to the sleeve, is also turned, regardless of the vertical position which it happens to be in at the time. When the knuckle 19 associated with one of the front wheels is turned, the knuckle associated with the other front wheel is caused to turn in unison therewith by a cross rod 44 which connects together the free ends of arms 45 carried by the sleeves 13.

I claim:

1. In a front wheel drive assembly, a bracket for attachment to the frame of a vehicle, a wheel for supporting the vehicle, a knuckle having a vertically extending portion which is mounted for both vertical and turning movement in the bracket and a hollow horizontally extending portion which forms a journal for the wheel, resiliently yieldable means for resisting vertical movement of the knuckle, a power-transmitting shaft in the horizontally extending portion of the knuckle connected with the wheel, a universal driving joint in the shaft in alignment with the axis of the vertically extending portion of the knuckle, a sleeve rotatably mounted in the bracket about the vertically extending portion of the knuckle in splined association with the latter, and a steering arm connected with the sleeve.

2. In a front wheel drive assembly, a bracket for attachment to the frame of a vehicle, a wheel for supporting the vehicle, a knuckle having a vertically extending portion which is mounted for both vertical and turning movement in the bracket and a hollow horizontally extending portion which forms a journal for the wheel, a leaf spring for resisting vertical movement of the knuckle, a coupling member in engagement with the spring swiveled to the knuckle in alignment with the axis of the vertically extending portion thereof, a power-transmitting shaft in the horizontally extending portion of the knuckle connected with the wheel, a universal driving joint in the shaft in alignment with the axis of the vertically extending portion of the knuckle, a sleeve rotatably mounted in the bracket about the vertically extending portion of the knuckle in splined association with the latter, and a steering arm connected with the sleeve.

In witness whereof I have hereunto subscribed my name.

JAMES A. WHITCOMB.